H. L. KUTTER.
BEARING.
APPLICATION FILED AUG. 18, 1910.

1,069,793.

Patented Aug. 12, 1913.

Witnesses
Charles G. Johannesmeyer.
M. S. Belden.

Inventor
Herman L. Kutter
by James W. See
Attorney

UNITED STATES PATENT OFFICE.

HERMAN L. KUTTER, OF HAMILTON, OHIO, ASSIGNOR TO THE BLACK-CLAWSON COMPANY, OF HAMILTON, OHIO.

BEARING.

1,069,793.  Specification of Letters Patent.  Patented Aug. 12, 1913.

Application filed August 18, 1910.  Serial No. 577,864.

*To all whom it may concern:*

Be it known that I, HERMAN L. KUTTER, a citizen of the United States, residing at Hamilton, Butler county, Ohio, have invented certain new and useful Improvements in Bearings, of which the following is a specification.

In certain classes of machinery, paper making machinery for instance, numerous rolls have their journals supported in bearings and it is desirable that the bearings shall be capable of rocking motions, not only to permit of the bearings alining themselves to bring about good running conditions, but also to permit one end of the roll to be removed from its bearing and raised to facilitate the withdrawing of the roll from the other bearing and from the felt or web or whatever may be supported by the roll. In other words, the bearing should be capable of a somewhat universal rocking motion in all directions and, as rocking bearings are usually made, this would not be consistent with economical construction. Bearings for use in the situations referred to are sometimes formed in general frame-parts, and sometimes secured thereto by being bolted upon or sidewise against frame-parts, and the bearings proper are sometimes solid, and sometimes gapped to permit the transverse displacement of the roll journals.

My present invention provides an exceedingly economical and efficient rocking bearing to satisfy conditions such as have been referred to, and the invention will be readily understood from the following description taken in connection with the accompanying drawing in which:—

Figure 1:
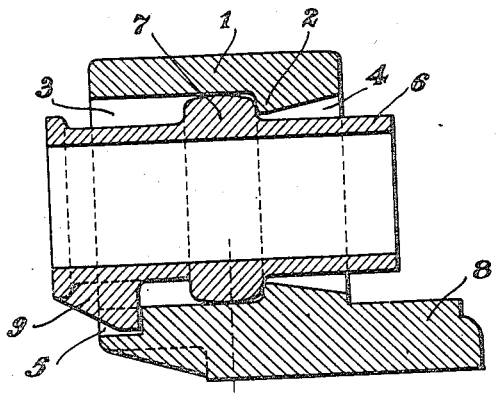
Figure 2:
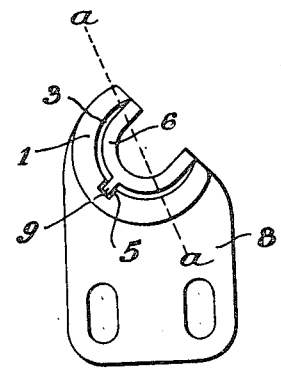
Figure 5:
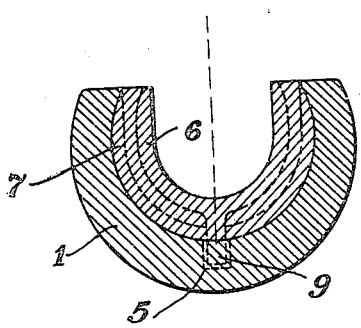
Figure 3:
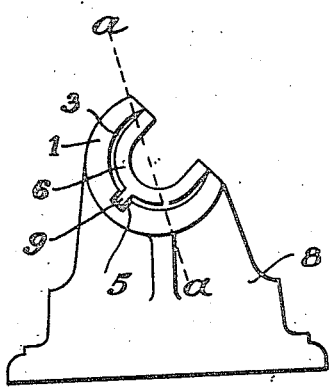
Figure 4:
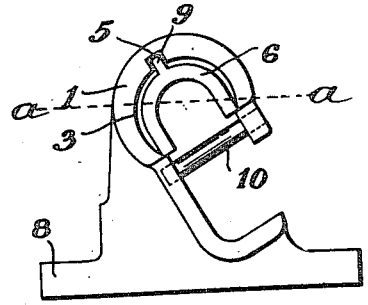

Figure 1 is a vertical longitudinal section of a bearing exemplifying my invention along the lines a—a in Figs. 2, 3, and 4. For the sake of clearness the notch 5 and tooth 9 engaged therein are swung down into the plane of line a—a; Fig. 2 an end elevation of the bearing gapped angularly upward and having a base to bolt against the side of a frame-part; Fig. 3 an end elevation of a similarly gapped bearing, the base, however, being formed, like those shown in Figs. 1 and 2 to bolt over a frame-part; Fig. 4 an end elevation of a bearing gapped angularly downwardly and having a base to bolt over a frame-part; and Fig. 5 a vertical transverse section through the center of the bearing.

The figures of the drawing are not all to the same scale.

In the drawing:—1, indicates a housing having a circular bore to receive the bushing or bearing proper; 2, an annular shoulder formed in the bore of the housing some distance from the end of the bearing; 3, the cylindrical counterbore of the housing whose inner termination is formed by the annular shoulder 2; 4, an outwardly flared portion of the bore of the housing beyond the annular shoulder; 5, a notch in one end of the housing extending radially from the counterbore; 6, the bushing or bearing proper, the same being disposed concentrically within the bore of the housing; 7, a frustum of a sphere formed upon the central portion of the bushing and having a diameter to freely engage the counterbore of the housing, one side of this zonic band coming near or to the annular shoulder 2; 8, the base of the housing providing for the housing being secured to the frame-part of a machine, Figs. 1, 3 and 4 showing bases adapted to be secured upon a frame surface parallel with the axis of the bearing, while Fig. 2 shows a base adapted to be secured against a frame surface at right angles to the axis of the bearing; and 9, a tooth projecting from the bushing at the end of the counterbore and adapted to freely engage notch 5 in the counterbore.

Looking at Fig. 1, the bearing is assembled by merely inserting the bushing endwise into the housing, and for ordinary practical work, as about paper making machines, no machine work whatever is required on the exterior of the bushing or the interior of the housing. The tooth of the bushing engages the notch of the housing and prevents rotation of the bushing. The bushing may have considerable rocking motion in all directions in the housing, and the journal-shoulder which is to be at the left of the bushing, will prevent the bushing from coming out of the housing. The bearings, as illustrated in the drawing, are gapped so that the journal may be removed by transverse displacement. In case the gap is downwardly presenting, as in Fig. 4, a keeper becomes necessary to prevent the journal from falling from the bushing when transverse strain is removed from the roll, and such keeper may be formed by a pin bridging the gap, as seen in Fig. 4. In these gapped constructions the circumference of the counterbore where it is engaged by the band, should extend more than halfway around the circles, as shown. This prevents the transverse displacement of the bushing from the housing and requires that the bushing be removed from the housing by endwise motion precisely as though the bushing and housing were not gapped.

I claim:—

1. A bearing structure comprising a housing provided with a longitudinal bore, having a side opening less than 180° in cross section, and having a shoulder within the bore, and a bushing within the bore having an enlarged substantially contral portion of substantially spherical surface and more than 180° in transverse section seated within said bore and against said shoulder, said bushing being open at one side to permit lateral emplacement of a shaft, said bushing constituting a shaft bearing, the housing also having a socket near one end thereof and a projection on the bushing engaging the socket to prevent rotation.

2. In a bearing structure, the combination of a base provided with an upright thereon, said upright being provided with a bushing housing, said housing being provided with a longitudinal bore and being also provided with a longitudnal gap in one side of said housing, said gap being directed downwardly and intersecting a cross-sectional arc in said longitudinal bore less than half of a circle, a bushing within said housing having an enlarged central portion with a convex periphery engaging the bore in said housing and gapped to permit lateral insertion and removal of a shaft, said housing being provided with a socket, a projection on the bushing engaging said socket to prevent rotation of the bushing and a keeper carried by the housing and bridging the opening therein to support a shaft mounted within the bushing in certain cases.

HERMAN L. KUTTER.

Witnesses:
M. S. BELDEN,
THOMAS B. LEWIS.